Sept. 30, 1924.  
F. A. DANNELLEY  
STARTER CASING  
Filed Nov. 3, 1922

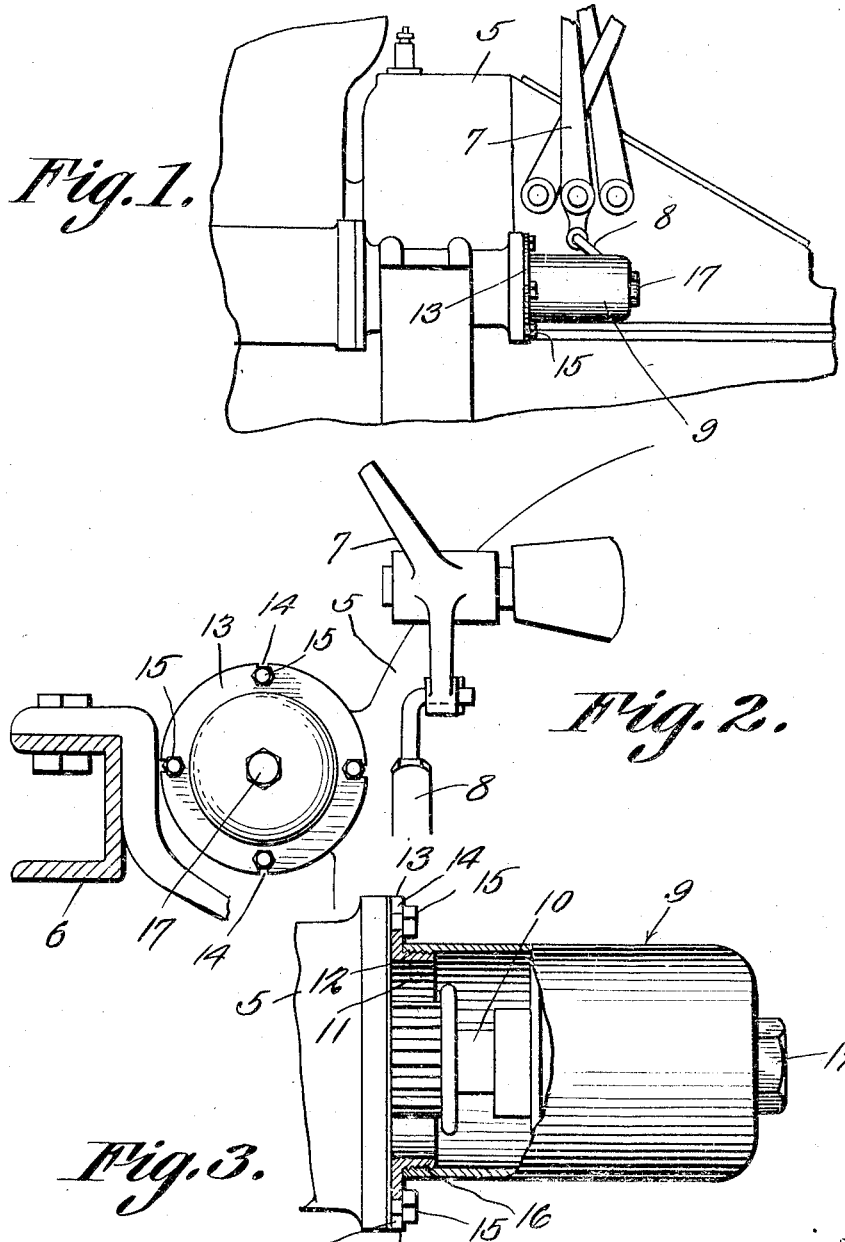

Inventor  
F. A. Dannelley  
By C. A. Snow & Co.  
Attorneys.

Patented Sept. 30, 1924.

1,510,044

UNITED STATES PATENT OFFICE.

FLETCHER A. DANNELLEY, OF LOCKHART, TEXAS.

STARTER CASING.

Application filed November 3, 1922. Serial No. 598,957.

*To all whom it may concern:*

Be it known that I, FLETCHER A. DANNELLEY, a citizen of the United States, residing at Lockhart, in the county of Caldwell and State of Texas, have invented a new and useful Starter Casing, of which the following is a specification.

This invention relates to a cover casing for a portion of the starting motor of a well known type of automobile and has for its object the provision of a casing that may be readily detached for the purpose of exposing the said member when it is desired to inspect the same for repair.

In the drawing:

Figure 1 is a view in side elevation of the device attached to the transmission housing of an automobile.

Figure 2 is an end elevation of the same parts of the automobile being in section.

Figure 3 is a detail view of the device a portion being in section.

Figure 4:
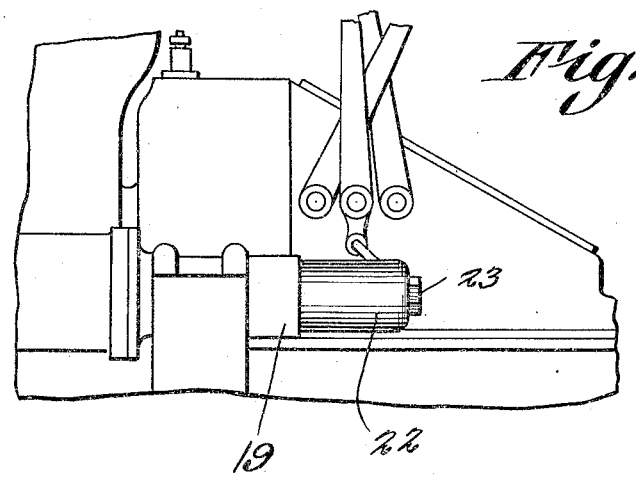
Figure 4 illustrates the application of a slightly modified form of attachment for the casing.

In a well known and popular make of automobile the housing for the bendix, a part of the electric starter, used to crank the engine, comprises a shell having at one end integral ears through which bolts pass to secure the housing to a portion of the automobile. The location of these bolts is such that to remove the housing for an inspection of the bendix assembly it is necessary for the operator to get beneath the car to remove some of the bolts with which the bendix cover is secured to the transmission housing of the automobile.

Furthermore the casing is located in close proximity on one side to the side rail of the chassis and on the other side to the link connecting the clutch pedal to the slow speed control. The location of the bolts, at opposite sides of the casing, between the casing and the parts of the automobile above referred to, render the use of an ordinary wrench a very difficult operation, it being necessary to use a special wrench in order to operate on these bolts.

In the present invention, a sleeve having the configuration of the attaching end of the casing now found on the car, replaces the said casing. The sleeve is screw threaded and a casing which covers the bendix is screwed on the sleeve.

After the sleeve is once installed on the car the casing may be very easily removed by simply unscrewing the casing from the sleeve which may be done conveniently from above the bendix.

Referring to the drawing the numeral 5 denotes the transmission housing of the automobile hereinbefore referred to. The side rail of the chassis is shown in section at 6. The clutch pedal is indicated at 7 and its connection to the slow speed control is indicated at 8.

The casing 9 for the bendix assembly 10 includes a sleeve 11 which is screw threaded as shown at 12; it being shown as externally threaded, it may however be internally threaded if desired. A circumferential flange 13 projects from one end of the sleeve and is provided with openings 14 for the reception of securing elements 15 by which the sleeve is secured to its seat on the transmission casing. The casing 9 is screw threaded on its open end at 16 to engage the threads on the sleeve, the opposite end is closed and provided with a hexagonal boss 17 to which a wrench may be applied.

Figures 5, 6:
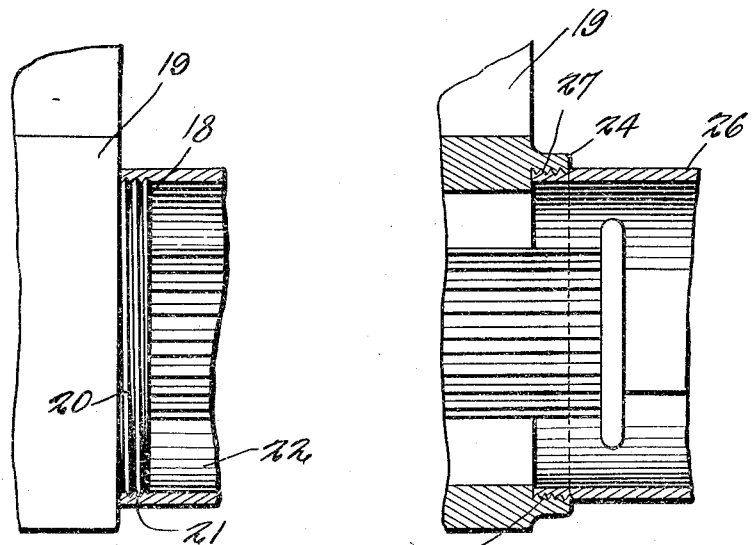
Figure 5 is a fragmentary sectional detail of the structure shown in Figure 4.
Figure 6 is a view similar to Figure 5 showing a further modification of the device.

As shown in Figures 4 and 5 a flange 18 may be formed integral with the transmission casing 19, the flange being screw threaded exteriorally as shown at 20 to engage the internally threaded portion 21 of a casing 22. The casing is similar to the casing 9, having its outer end closed and provided with a hexagonal portion 23.

It may be found desirable to form a flange 24, as shown in Figure 6, the same being internally threaded at 25. A casing 26 is threaded at 27 to engage the threads on the sleeve 24.

In the forms illustrated in Figures 4, 5 and 6 the number of parts are reduced to a minimum and the chance of the casing becoming loose is thereby lessened.

Removal of the casing is greatly facilitated by the improvement here shown and the operation heretofore quite difficult is rendered simple and easily performed.

Having thus described the invention, what is claimed is:

In a motor-propelled vehicle, a transmission housing, a chassis rail disposed adjacent to the housing, a pedal and a pedal-operated member mounted on the housing, a rearwardly extended sleeve, securing elements connecting the sleeve to the housing, the chassis rail and the pedal-operated member being so located as to render certain of the securing elements inaccessible, and a rearwardly extended bendix casing threaded on the sleeve, the casing, the pedal and the pedal-operated member being located on the same side of the housing, the casing being provided on its rear end with a wrench-engaging means, the pedal-operated member being located in advance of the wrench-engaging means, and the wrench-engaging means being of such diameter that a wrench applied thereto may be operated readily between the transmision housing and the chassis rail.

In testimony that I claim the foregoing as my own, I have hereto affixed my signature in the presence of two witnesses.

FLETCHER A. DANNELLEY.

Witnesses:
W. R. CLARK,
J. W. HARTSFIELD.